C. E. WILLIS.
DEVICES FOR CONVERTING MOTION.
No. 7,160. Reissued June 6, 1876.
Fig. 1
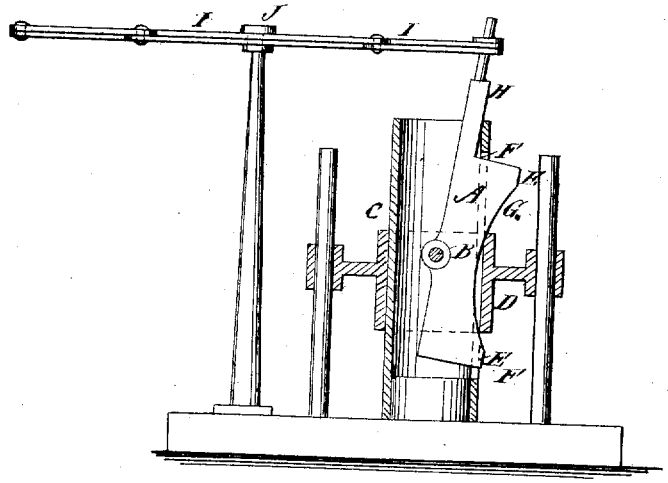
Fig. 2
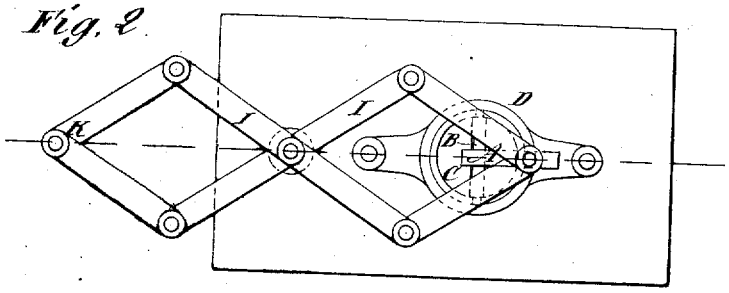
Fig. 3
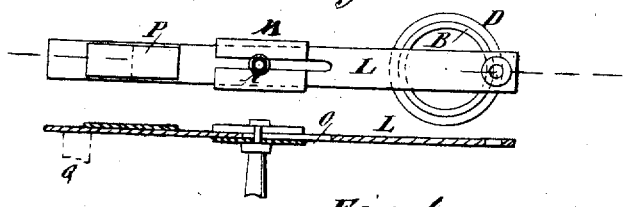
Fig. 4
WITNESSES:
C. Nevens
John Goethals
INVENTOR:
C. E. Willis
BY Munn & Co
ATTORNEYS.
N. PETERS, PHOTO-LITHOGRAPHER, WASHINGTON, D. C.

UNITED STATES PATENT OFFICE.

CHARLES E. WILLIS, OF NEW YORK, N. Y.

IMPROVEMENT IN DEVICES FOR CONVERTING MOTION.

Specification forming part of Letters Patent No. 175,805, dated April 4, 1876; reissue No. 7,160, dated June 6, 1876; application filed May 22, 1876.

*To all whom it may concern:*

Be it known that I, CHARLES E. WILLIS, of the city, county, and State of New York, have invented a new and Improved Universal Cam-Motion, of which the following is a specification:

My invention relates to means for producing motion in any direction at the will of the operator—such, for example, as is required for the feed of a sewing-machine, to sew in any direction without turning the work, and for other like purposes. It consists of a working bar or lever arranged on a support, which support is capable of being shifted around on its axis, so that the lever which is mounted thereon can work in any direction radial to the axis of said support, and the bar or lever is surrounded by a ring, which reciprocates on the support, to any part of which the bar is presented by the turning of the support, so as to be worked in any direction by the action of the ring on the cam projections of the bar; but other means may be employed for vibrating the lever.

The motion is transmitted in some cases from the lever by an arm, to which one end of a bar is attached, which is mounted so as to both vibrate and reciprocate, and which works the feed or other device by its other end; but as this contrivance does not in all cases give the motion in straight lines, I have devised a combination of compound parallel-bar mechanism with the lever-cam, by which the feed or other device operated is moved in straight lines in all cases.

Figure 1 is a sectional elevation of my improved universal-cam mechanism, with the parallel-bar contrivance for transmitting the motion, taken on the line *x x*. Fig. 2 is a top view of Fig. 1. Fig. 3 is a plan of the same, showing the arrangement of the single bar for transmitting the motion; and Fig. 4 is a section of Fig. 3, taken on line *y y*.

Similar letters of reference indicate corresponding parts.

A represents the lever-cam, which is pivoted at B within the supporting-tube C, which is capable of turning freely on its axis; but the support need not necessarily be tubular. D is the ring or hollow cross-head for working the lever-cam. It is fitted on the exterior of the tube so as to slide freely, and will, in practice, be operated by any approved means. The projections E of the lever-cam extend out through the slot F, one on each side of the ring, so as to be alternately worked out and in as the ring moves forward and backward along the curve G.

The support will have worm-gears or other devices connected with it for turning and setting, according to the direction it is wanted to work the lever-cam, and an indicator may be applied to assist in adjusting it accurately.

H is the arm for transmitting the motion from the lever-cam, said arm being connected to one end of the lazy-tongs or parallel-bar contrivance I, fixed on a pivot at J, and designed to connect at its other end, K, with the feed or other device to be worked. The parallel-bar mechanism will be used when more exact work is required; but for such as is not important in this respect a simple bar, L, will be used, said bar being arranged in a guide, M, in which it can slide lengthwise, the guide being fixed on a pivot, N, so that it can oscillate; or the bar may be fixed on the pivot N by a slot, O, without the guide.

When the bar L is to be used to work a feeder for sewing-machines, it may be jointed, as at P, or in any other approved way, in order that it may rise and fall to allow of the up-and-down motion of the feeder, and it may be employed for giving that motion also by a cam, Q, if desired.

Having thus described my invention, I claim as new and desire to secure by Letters Patent—

1. A working bar or lever for transmitting motion, having its support arranged to revolve about the longitudinal axis of the bar or lever, to allow the lever to work in any direction radial to said axis, substantially as specified.

2. A working bar or lever for transmitting motion, having its support arranged to revolve about the longitudinal axis of the bar or lever, in combination with a bar or lever, L, that is free to work in any direction radial to its fulcrum, substantially as specified.

3. The combination of lever-cam A, revolving support C, and reciprocating ring D, substantially as specified.

4. The reciprocating ring D, combined and arranged with double cam A, having two projections, E, substantially as specified.

5. The combination of the parallel-bar frame I and the variable cam A, substantially as specified.

CHAS. E. WILLIS.

Witnesses:
T. B. MOSHER,
ALEX. F. ROBERTS.